(12) United States Patent
Zhang et al.

(10) Patent No.: US 11,290,988 B2
(45) Date of Patent: Mar. 29, 2022

(54) UE INDICATED TIMING RELATION FOR UL TRANSMISSION

(71) Applicant: QUALCOMM Incorporated, San Diego, CA (US)

(72) Inventors: Xiaoxia Zhang, San Diego, CA (US); Andrei Dragos Radulescu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/264,382

(22) Filed: Jan. 31, 2019

(65) Prior Publication Data

US 2019/0246391 A1    Aug. 8, 2019

Related U.S. Application Data

(60) Provisional application No. 62/625,708, filed on Feb. 2, 2018.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1812* (2013.01); *H04L 5/0053* (2013.01);
(Continued)

(58) Field of Classification Search
CPC ....... H04L 1/18; H04L 1/1829; H04L 1/1867; H04W 76/28; H04W 72/04; H04W 36/08;
(Continued)

(56) References Cited

U.S. PATENT DOCUMENTS

2013/0165134 A1 6/2013 Touag et al.
2014/0044040 A1 2/2014 Chen et al.
(Continued)

FOREIGN PATENT DOCUMENTS

WO WO-2014110801 A1 7/2014
WO WO-2017197264 A1 11/2017

OTHER PUBLICATIONS

Intel Corporation: "HARQ Aspects on AUL", 3GPP Draft; R2-1712623, HARQ aspects on AUL, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 27, 2017-Dec. 1, 2017 Nov. 17, 2017, XP051371318, Retrieved from the Internet: URL:http://www.3gpp.org/ftp/tsg%5Fran/WG2%5FRL2/TSGR2%5F100/Docs/ [retrieved on Nov. 17, 2017], 5 pages.
(Continued)

*Primary Examiner* — Anez C Ebrahim
(74) *Attorney, Agent, or Firm* — Qualcomm Incorporated

(57) ABSTRACT

Some communication systems enable a user equipment (UE) to have different timelines depending on a category of the UE. One goal of the present method and apparatus is to improve channel utilization by reducing uplink transmission delays (or latency) for a UE in the unlicensed spectrum by not having to rely on a base station to have access to the wireless medium in order to assign a grant to the UE. The UE can transmit on an autonomous uplink (AUL) without having received an uplink grant. When a UE sends AUL traffic during a UE indicated timeline, the base station can indicate a reduced uplink physical uplink shared channel (PUSCH) processing timeline to the UE. The base station may further configure downlink feedback information (DFI) or downlink control information (DCI) monitoring opportunities for the UE. The UE may indicate the preferred AUL processing timeline.

43 Claims, 12 Drawing Sheets

(51) Int. Cl.
  *H04L 27/00* (2006.01)
  *H04W 76/28* (2018.01)
  *H04W 76/27* (2018.01)
  *H04L 1/18* (2006.01)
  *H04W 74/08* (2009.01)

(52) U.S. Cl.
  CPC ........ *H04L 5/0055* (2013.01); *H04L 27/0006* (2013.01); *H04W 72/0406* (2013.01); *H04W 76/27* (2018.02); *H04W 76/28* (2018.02); *H04W 74/0808* (2013.01)

(58) Field of Classification Search
  CPC ..... H04W 40/36; H04W 76/27; H04W 36/22; H04W 36/0066; H04W 72/0406
  See application file for complete search history.

(56) References Cited

U.S. PATENT DOCUMENTS

| | | | |
|---|---|---|---|
| 2015/0110026 A1* | 4/2015 | Lee | H04W 72/0413 370/329 |
| 2017/0230838 A1 | 8/2017 | Yerramalli et al. | |
| 2019/0150184 A1* | 5/2019 | Golitschek Edler von Elbwart | H04L 1/1887 370/329 |

OTHER PUBLICATIONS

International Search Report and Written Opinion—PCT/US2019/016387—ISA/EPO—dated Apr. 15, 2019 (181571WO).

\* cited by examiner

US 11,290,988 B2

UE INDICATED TIMING RELATION FOR UL TRANSMISSION

CLAIM OF PRIORITY UNDER 35 U.S.C. § 119

This application claims the benefit of U.S. Provisional Application No. 62/625,708, entitled "UE INDICATED TIMING RELATION FOR UL TRANSMISSION" and filed on Feb. 2, 2018, the entire content of which is hereby incorporated by reference.

BACKGROUND

Field

Aspects of the present disclosure generally relate to unlicensed, wireless communications, and more specifically to autonomous uplink communications.

Background

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

SUMMARY

A method, and apparatus for indicating a flexible timeline for an uplink (UL) transmission by a user equipment (UE) is described. The UE may receive a feedback monitoring opportunity configuration that identifies a set of uplink processing timelines. The UE may transmit an indication of a first uplink processing timeline of the set of uplink processing timelines. The UE may transmit an uplink transmission to a base station and may monitor for feedback from the base station associated with the uplink transmission based at least in part on the indicated first uplink processing timeline.

In one aspect, the uplink transmission is an autonomous uplink (AUL) transmission or a scheduled uplink (SUL) transmission.

In another aspect, the feedback monitoring opportunity configuration is received in a Radio Resource Control (RRC) message or in an AUL transmission activation command. In another aspect, the first uplink processing timeline is transmitted in the Uplink Control Information (UCI) or in the scheduling request.

In still another aspect, the UE may receive the feedback in downlink feedback information (DFI) or downlink control information (DCI) based at least in part on the monitoring.

In still another aspect, the UE monitors for the feedback during a Discontinuous Reception (DRX) ON cycle, after a first hybrid automatic repeat request (HARD) process of the uplink transmission, or after a last HARQ process of the uplink transmission.

In another aspect, the set of uplink processing timelines comprises: waking up, by the UE, at a next Discontinuous Reception (DRX) ON duration to monitor for the feedback; waking up, by the UE, at a configured period to monitor for the feedback; monitoring, by the UE, for the feedback after a processing time of a first HARQ process is complete; or monitoring, by the UE, for an AUL downlink feedback information (DFI) that includes at least one acknowledge (ACK)/negative acknowledge (NACK) for a plurality of physical uplink shared channel (PUSCH) HARQ process.

In still another aspect, monitoring for the feedback further comprises monitoring, by the UE, for the feedback based at least in part a minimum PUSCH processing timeline. The minimum PUSCH processing timeline may be predefined, or may be received during an autonomous uplink activation or in an RRC message from the base station.

In another aspect, the method further comprises the first uplink processing timeline based at least in part on a delay sensitivity of the uplink transmission.

DETAILED DESCRIPTION

Figure 1:
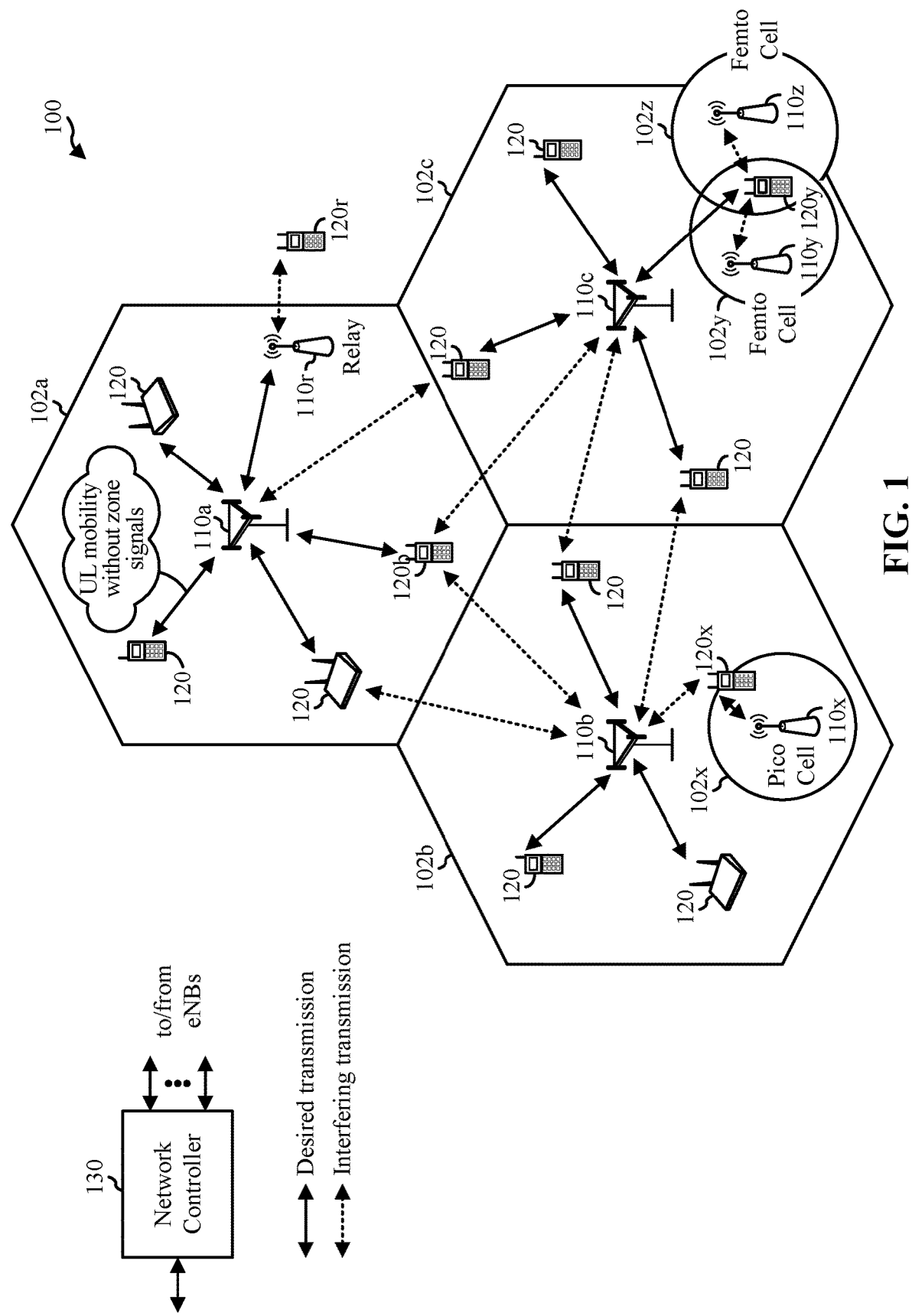
FIG. 1 illustrates an exemplary wireless communication system, in accordance with certain aspects of the present disclosure.

With 5G NR, subcarrier spacing may be scaled. Also, the waveforms selected for 5G include cyclic prefix orthogonal frequency-division multiplexing (CP-OFDM) and DFT-Spread (DFT-s) OFDM. In addition, 5G allows for switching between both CP-OFDM and DFT-S-OFDM on the uplink to get the spatial multiplexing benefit of CP-OFDM and the link budget benefit of DFT-S OFDM. With Long Term Evolution (LTE), orthogonal frequency-division multiple access (OFDMA) communications signals may be used for downlink communications, while Single-Carrier Frequency-Division Multiple Access (SC-FDMA) communications signals may be used for LTE uplink communications. The DFT-s-OFDMA scheme spreads a plurality of data symbols (i.e., a data symbol sequence) over a frequency domain. Also, in comparison to the OFDMA scheme, the SC-FDMA or DFT-s-OFDMA schemes can greatly reduce a peak to average power ratio (PAPR) of a transmission signal. The terms DFT-s-OFDMA and SC-FDMA may be used interchangeably, in some cases.

Scalable OFDM multi-tone numerology is another feature of 5G. Prior versions of LTE supported a mostly fixed OFDM numerology of 15 kHz spacing between OFDM tones (often called subcarriers) and carrier bandwidths up to 20 MHz. Scalable OFDM numerology has been introduced in 5G to support diverse spectrum bands/types and deployment models. For example, 5G NR is able to operate in mmWave bands that have wider channel widths (e.g., 100s of MHz) than currently used in LTE. Also, the OFDM subcarrier spacing is able to scale with the channel width, so the Fast Fourier Transform (FFT) size scales such that processing complexity does not increase unnecessarily for wider bandwidths. In the present application, numerology refers to the different values that different features of a communication system can take, such as subcarrier spacing, cyclic prefix, symbol length, FFT size, TTI, etc.

Also in LTE and 5G NR, cellular technologies have been expanded into the unlicensed spectrum, which may provide added capacity. A first member of this technology family is referred to as LTE Unlicensed or LTE-U. By aggregating LTE in an unlicensed spectrum with an 'anchor' channel in a licensed spectrum, faster downloads are enabled. Also, LTE-U shares the unlicensed spectrum fairly with Wi-Fi. This is an advantage because in the 5 GHz unlicensed band where Wi-Fi devices are widely used, it is desirable for LTE-U to coexist with Wi-Fi. However, an LTE-U network may cause Radio Frequency (RF) interference to an existing co-channel Wi-Fi device. Choosing a preferred operating channel and reducing interference caused to nearby Wi-Fi networks is a goal for LTE-U devices. However, the LTE-U single carrier (SC) device may operate on the same channel as Wi-Fi if all available channels are occupied by Wi-Fi devices. To coordinate spectrum access between LTE-U and Wi-Fi, the energy across the intended transmission band is first detected. This energy detection (ED) mechanism informs the device of ongoing transmissions by other nodes. Based on this ED information, a device decides if it should transmit. A Wi-Fi device may not back off to LTE-U unless its interference level is above an energy detection threshold (−62 decibel-milliwatts (dBm) over 20 megahertz (MHz)). Thus, without proper coexistence mechanisms in place, LTE-U transmissions could cause considerable interference on a Wi-Fi network relative to Wi-Fi transmissions. In 5G NR, unlicensed spectrum may be used in both stand-alone and licensed-assisted (LAA) schemes. LAA is another member of the unlicensed technology family and like LTE-U, it also uses an anchor channel in licensed spectrum. However, it also adds "listen before talk" (LBT) to the LTE functionality. In addition, carriers for LTE or 5G NR may occupy frequencies up to 60 gigahertz (GHz), also known as mmWave.

A gating interval may be used to gain access to a channel of a shared spectrum. The gating interval may determine the application of a contention-based protocol such as an LBT protocol. The gating interval may indicate when a Clear Channel Assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically for a predefined transmission interval. Thus, with unlicensed spectrum, a "listen before talk" procedure is performed before transmitting a message. If the channel is not cleared for use, then a device will not transmit.

Another member of this family of unlicensed technologies is LIE-Wireless Local Area Network (WLAN) Aggregation (WA), which utilizes both LIE and Wi-Fi. Accounting for channel conditions for both LIE and Wi-Fi, LWA can split a single data flow into two data flows which allows both the LIE and the Wi-Fi channel to be used for an application. Instead of competing with Wi-Fi, the LIE signal is using the WLAN connections seamlessly to increase capacity.

Another member of this family of unlicensed technologies is MulteFire. MulteFire opens up new opportunities by operating 4G LIE technology solely in unlicensed spectrum such as the global 5 GHz band, Unlike LTE-U and LAA, MulteFire allows entities without any access to licensed spectrum to use LIE or 5G NR technologies. Thus, it operates in unlicensed spectrum on a standalone basis, that is, without any anchor channel in the licensed spectrum. Thus, LTE-U, LAA, and LWA differ from MulteFire because they aggregate unlicensed spectrum with an anchor in licensed spectrum. Without relying on licensed spectrum as the anchoring service, MulteFire allows for Wi-Fi like deployments. A MulteFire network may include access points (APs) and/or base stations 110 communicating in an unlicensed radio frequency spectrum band, e.g., without a licensed anchor carrier.

A discovery reference signal (DRS) Measurement Timing Configuration (DMTC) is a technique that allows MulteFire to transmit but with minimal interference to other unlicensed technology including Wi-Fi. Additionally, the periodicity of discovery signals is very sparse. This allows MulteFire to occasionally access channels, transmit discovery and control signals, and then vacate the channels. Since the unlicensed spectrum is shared with other radios of similar or dissimilar wireless technologies, LBT techniques may be applied for channel sensing. LBT involves sensing the medium for a pre-defined minimum amount of time and backing off if the channel is busy. Therefore, the initial random access (RA) procedure for standalone LTE-U should involve as few transmissions as possible and also have low latency, such that the number of LBT operations can be minimized and the RA procedure can then be completed as quickly as possible.

Leveraging a DMTC window, MulteFire algorithms search and decode reference signals in an unlicensed band from neighboring base stations in order to know which base station would be best for serving the user. As the caller moves past one base station, their UE sends a measurement report to it, triggering a handover at the right moment, and transferring the caller (and all of their content and information) to the next base station.

Since LTE traditionally operated in licensed spectrum and Wi-Fi operated in unlicensed bands, coexistence with Wi-Fi or other unlicensed technology was not considered when LTE was designed. In moving to the unlicensed world, the LTE waveform was modified and algorithms were added in order to perform LBT. This allows unlicensed incumbents, including Wi-Fi, to have less interference because a device following LBT will not just acquire a channel and immediately transmit. The present example supports LBT and the detection and transmission of a Wi-Fi Channel Usage Beacon Signal (WCUBS) for ensuring coexistence with Wi-Fi neighbors.

MulteFire was designed to "hear" transmissions for a neighboring Wi-Fi device. MulteFire listens first, and autonomously makes the decision to transfer when there is no other neighboring Wi-Fi transmitting on the same channel. This technique ensures co-existence between MulteFire and Wi-Fi.

Additionally, techniques and devices described herein may adhere to the unlicensed rules and regulations set by 3GPP and the European Telecommunications Standards Institute (ETSI), which mandates the −72 dBm LBT detection threshold. This further helps devices reduce conflict with Wi-Fi. MulteFire's LBT design may be identical to the standards defined in 3GPP for LAA/eLAA and may comply with ETSI rules.

An expanded functionality for 5G involves the use of 5G NR Spectrum Sharing, or NR-SS. 5G spectrum sharing enables enhancement, expansion, and upgrade of the spectrum sharing technologies introduced in LTE. These include LTE Wi-Fi Aggregation (LWA), License Assisted Access (LAA), enhanced License Assisted Access (eLAA), and Citizen's Broadband Radio Service (CBRS)/License Shared Access (LSA).

Aspects of the disclosure are initially described in the context of a wireless communication system. Aspects of the disclosure are then illustrated by and described with reference to apparatus diagrams, system diagrams, and flowcharts that relate to receiving on transmit and transmitting on receive.

FIG. 1 illustrates an exemplary wireless communication system 100, such as a new radio (NR) or 5G network, in which aspects of the present disclosure may be performed.

As illustrated in FIG. 1, the wireless communication system 100 may include a number of base stations (BSs) 110 and other network entities. ABS 110 may be a station that communicates with UEs 120. Each BS 110 may provide communication coverage for a particular geographic coverage area 102. In 3GPP, the term "cell" can refer to a geographic coverage area 102 of a BS and/or a BS subsystem serving this coverage area, depending on the context in which the term is used. In NR systems, the term "cell" and the terms Node B (NB), enhanced NB (eNB), 5G NB, AP, NR BS, NR BS, 5G Radio NodeB (gNB), or transmission reception point (TRP) may be interchangeable. In some aspects, a cell may not necessarily be stationary, and the geographic area 102 of the cell may move according to the location of a mobile BS 110. In some aspects, the BSs 110 may be interconnected to one another and/or to one or more other BSs 110 or network nodes in the wireless communication system 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs in a Closed Subscriber Group (CSG), UEs for users in the home, etc.). ABS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication system 100 may also include relay stations. A relay station may also be referred to as a relay BS, a relay, etc. A relay station is a station that receives a transmission of data and/or other information from an upstream station (e.g., a BS or a UE) and sends a transmission of the data and/or other information to a downstream station (e.g., a UE or a BS). A relay station may also be a UE 120 that relays transmissions for other UEs 120. In the example shown in FIG. 1, a relay station 110r may communicate with the BS 110a and a UE 120r in order to facilitate communication between the BS 110a and the UE 120r.

The wireless communication system 100 may be a heterogeneous network that includes BSs 110 of different types, e.g., macro BS, pico BS, femto BS, relays, etc. These different types of BSs may have different transmit power levels, different coverage areas, and different impacts on interference in the wireless communication system 100. For example, macro BS may have a high transmit power level (e.g., 20 Watts) whereas pico BS, femto BS, and relays may have a lower transmit power level (e.g., 1 Watt).

The wireless communication system 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may be coupled to a set of BSs 110 and provide coordination and control for these BSs 110. The network controller 130 may communicate with the BSs 110 via a backhaul. The BSs 110 may also communicate with one another, e.g., directly or indirectly via wireless or wireline backhaul.

The UEs 120 (e.g., 120a, 120b, 120x, 120y, etc.) may be dispersed throughout the wireless communication system 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial, etc.), or any other suitable device that is configured to communicate via a wireless or wired medium.

Some UEs 120 may be considered machine-type communication (MTC) devices or evolved MTC (eMTC) devices, which may include remote devices that may communicate with a base station 110, another remote device, or some other entity. MTC may refer to communication involving at least one remote device on at least one end of the communication and may include forms of data communication which involve one or more entities that do not necessarily need human interaction. MTC UEs 120 may be capable of MTC communications with MTC servers and/or other MTC devices through a Public Land Mobile Network (PLMN), for example. MTC and eMTC UEs 120 include, for example, robots, drones, remote devices, sensors, meters, monitors, cameras, location tags, etc., that may communicate with a BS 110, another device (e.g., remote device), or some other entity. A wireless node may provide, for example, connectivity for or to a network (e.g., a wide area network such as Internet or a cellular network) via a wired or wireless communication link. MTC UEs 120, as well as other UEs 120, may be implemented as Internet-of-Things (IoT) devices, e.g., narrowband IoT (NB-IoT) devices. In NB IoT, the uplink and downlink may have higher periodicities and repetition interval values as a UE 120 decodes data in extended coverage.

In FIG. 1, a solid line with double arrows indicates desired transmissions between a UE 120 and a serving BS 110, which is a BS 110 designated to serve the UE 120 on the downlink and/or uplink. A dashed line with double arrows indicates interfering transmissions between a UE 120 and a BS 110.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 resource blocks), and there may be 1, 2, 4, 8, or 16 subbands for system bandwidth of 1.25, 2.5, 5, 10, or 20 MHz, respectively.

While aspects of the examples described herein may be associated with LTE technologies, aspects of the present disclosure may be applicable with other wireless communications systems, such as NR. NR may utilize OFDM with a CP or DFT-S-OFDM on the uplink and downlink and include support for half-duplex operation using time division duplex (TDD). A carrier may be referred to as a component carrier (CC), and CC bandwidths up to or greater than 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., downlink (DL) or uplink (UL)) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with up to 8 streams of multi-layer DL transmissions and up to 2 streams per UE 120. Multi-layer transmissions with up to 2 streams per UE 120 may be supported. Aggregation of multiple cells may be supported with up to 8 serving cells. Alternatively, NR may support a different air interface, other than an OFDM-based air interface. NR networks may include entities such as central units (CUs) and/or distributed units (DUs).

In some aspects, access to the air interface may be scheduled, wherein a scheduling entity (e.g., a BS 110) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs 110 are not the sole entities that may function as a scheduling entity. That is, in some aspects, a UE 120 may function as a scheduling entity and may schedule resources for one or more subordinate entities (e.g., one or more other UEs 120). In this example, the UE 120 is functioning as a scheduling entity, and other UEs utilize resources scheduled by the UE 120 for wireless communication. A UE 120 may function as a scheduling entity in a peer-to-peer (P2P) network, and/or in a mesh network. In a mesh network example, UEs 120 may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and one or more DUs. A NR BS (e.g., eNB, 5G Node B, Node B, TRP, AP, or gNB) may correspond to one or multiple BSs 110. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. DCells may or may not transmit synchronization signals (SS). NR BSs 110 may transmit downlink signals to UEs 120 indicating the cell type. Based on the cell type indication, the UE 120 may communicate with the NR BS 110. For example, the UE 120 may determine NR BSs 110 to consider for cell selection, access, handover, and/or measurement based on the indicated cell type.

Figure 2:
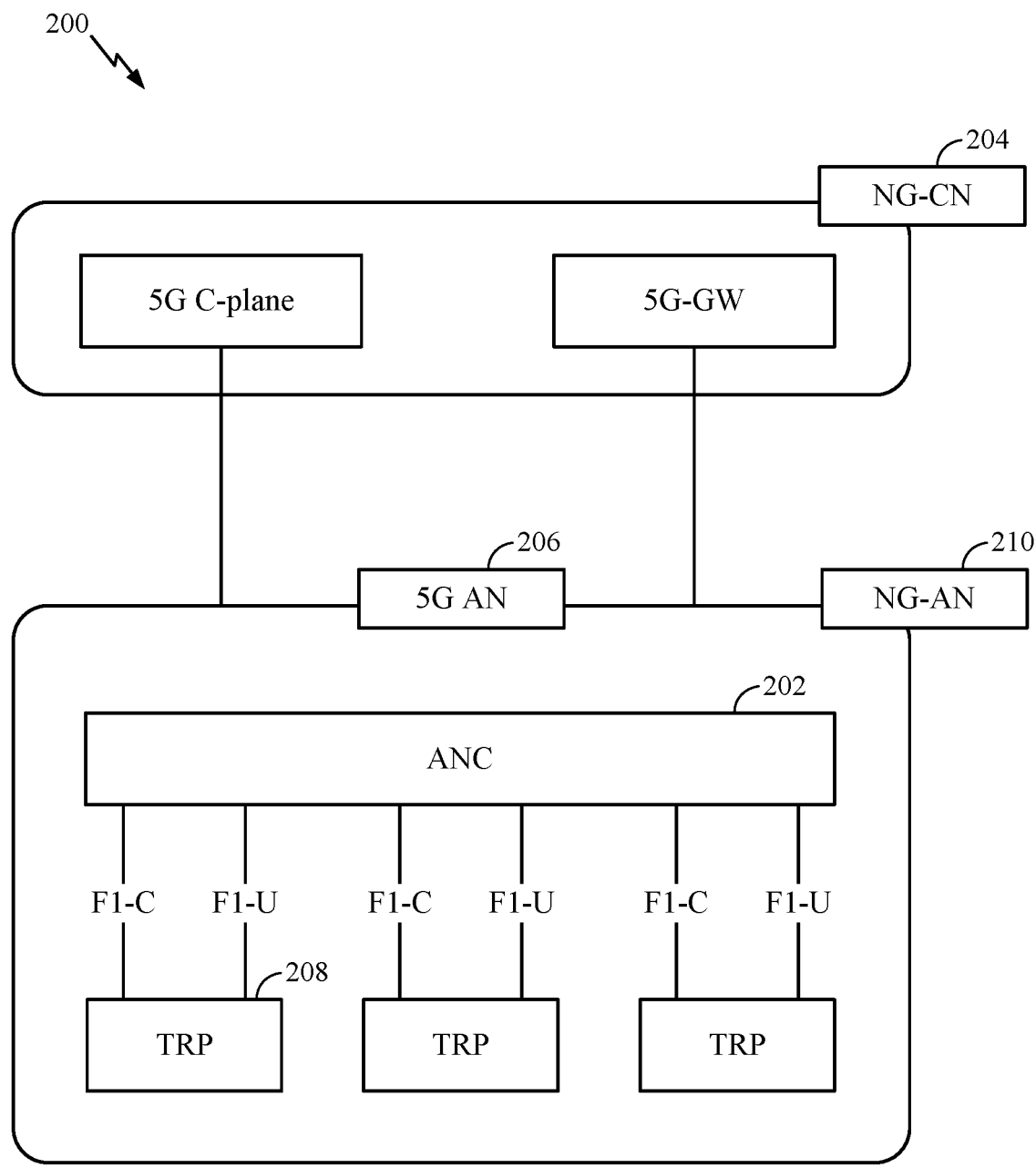
FIG. 2 is a block diagram illustrating an exemplary logical architecture of a distributed radio access network (RAN), in accordance with certain aspects of the present disclosure.

FIG. 2 illustrates an exemplary logical architecture of a distributed radio access network (RAN) 200, which may be implemented in the wireless communication system 100 illustrated in FIG. 1. A 5G access node 206 may include an access node controller (ANC) 202. The ANC 202 may be a CU of the distributed RAN 200. The backhaul interface to a next generation core network (NG-CN) 204 may terminate at the ANC 202. The backhaul interface to neighboring next generation access nodes (NG-ANs 210) may terminate at the ANC 202. The ANC 202 may include one or more TRPs 208 (which may also be referred to as BSs, NR BSs, Node Bs, 5G NBs, APs, eNB, gNB, or some other term). As described above, a TRP 208 may be used interchangeably with "cell."

One or more of the TRPs 208 may be a DU. The TRPs 208 may be connected to one ANC 202 or more than one ANC 202. For example, for RAN sharing, radio as a service (RaaS), and service specific AND deployments, the TRP 208 may be connected to more than one ANC. A TRP 208 may include one or more antenna ports. The TRPs 208 may be configured to individually (e.g., dynamic selection) or jointly (e.g., joint transmission) serve traffic to a UE.

The RAN 200 may be used to illustrate a fronthaul definition. The architecture may be defined to support fronthauling solutions across different deployment types. For example, the architecture may be based on transmit network capabilities (e.g., bandwidth, latency, and/or jitter).

The architecture may share features and/or components with LTE. According to techniques described herein, the next generation AN (NG-AN) 210 may support dual connectivity with NR. The NG-AN 210 may share a common fronthaul for LTE and NR.

The architecture may enable cooperation between and among the TRPs 208. For example, cooperation may be preset within a TRP 208 and/or across the TRPs 208 via the ANC 202. According to some examples, no inter-TRP interface may be needed or present.

According to aspects, a dynamic configuration of split logical functions may be present within the RAN 200. A Radio Resource Control (RRC) layer, a Packet Data Convergence Protocol (PDCP) layer, a Radio Link Control (RLC) layer, a Medium Access Control (MAC) layer, and a Physical (PHY) layer may be adaptably placed at the DU or CU (e.g., TRP or ANC, respectively). According to certain aspects, a BS may include a CU (e.g., ANC 202) and/or one or more distributed units (e.g., one or more TRPs 208).

Figure 3:
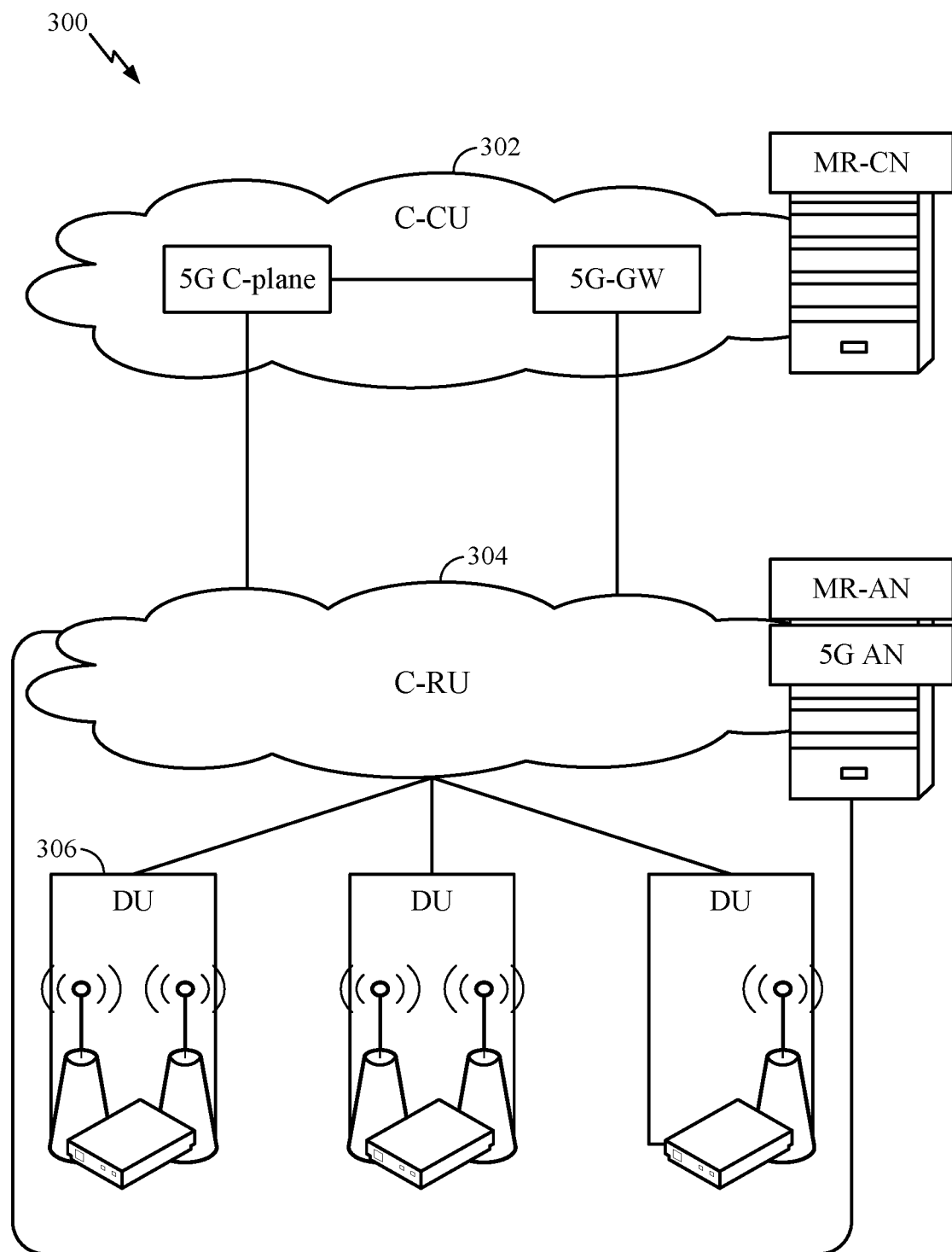
FIG. 3 is a diagram illustrating an exemplary physical architecture of a distributed RAN, in accordance with certain aspects of the present disclosure.

FIG. 3 illustrates an exemplary physical architecture of a distributed RAN 300, according to aspects of the present disclosure. A centralized core network unit (C-CU) 302 may host core network functions. The C-CU 302 may be centrally deployed. Functionality of the C-CU 302 may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be closer to the network edge.

A DU 306 may host one or more TRPs (e.g., edge node (EN), an edge unit (EU), a radio head (RH), a smart radio head (SRH), or the like). The DU 306 may be located at edges of the network with RF functionality.

Figure 4:
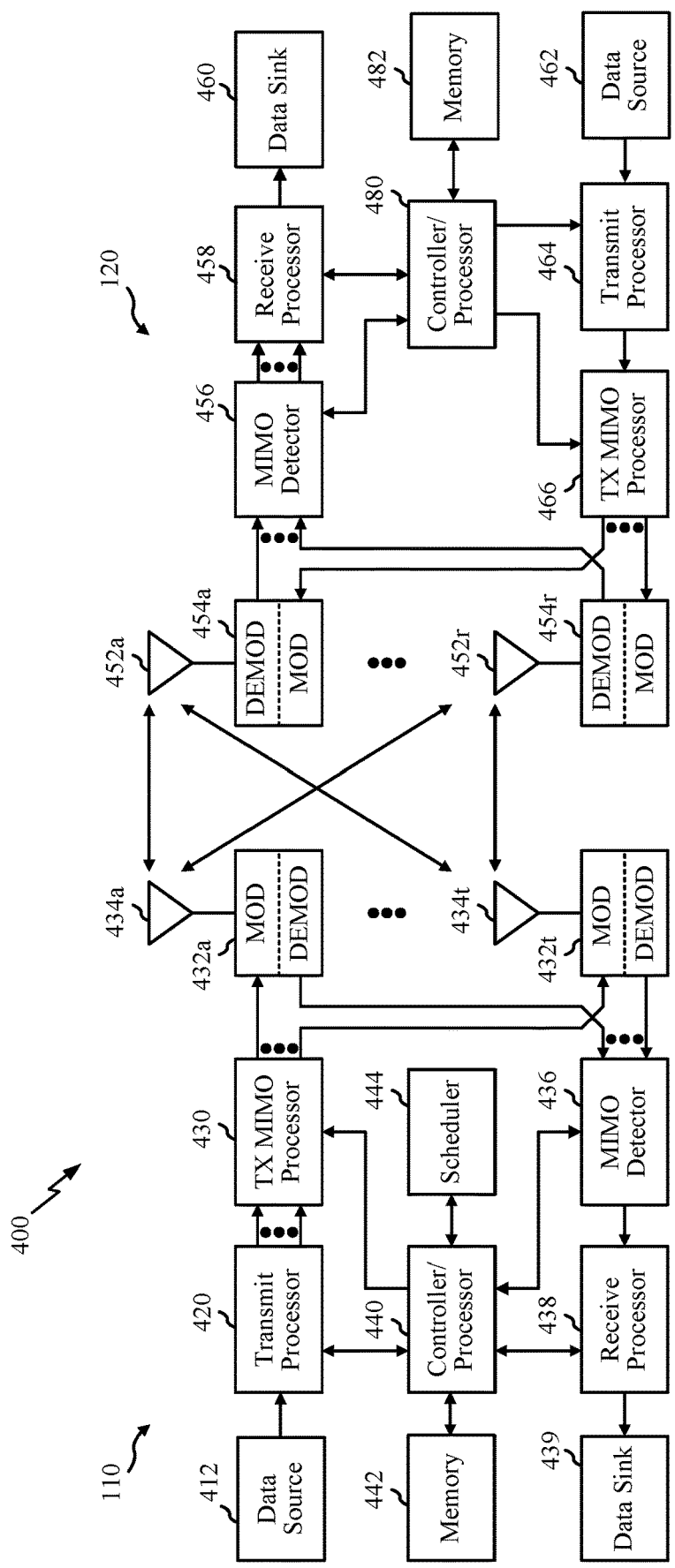
FIG. 4 is a block diagram conceptually illustrating a design of an exemplary base station (BS) and UE, in accordance with certain aspects of the present disclosure.

FIG. 4 illustrates exemplary components of a BS 110 and a UE 120 illustrated in FIG. 1, which may be used to implement aspects of the present disclosure. In the example of FIG. 4, the BS 110 may be the macro BS 110c in FIG. 1, and the UE 120 may be the UE 120y. The BS 110 may also be a base station of some other type. The BS 110 may be equipped with antennas 434a through 434t, and the UE 120 may be equipped with antennas 452a through 452r. As described above, the BS 110 may include a TRP. One or more components of the BS 110 and UE 120 may be used to practice aspects of the present disclosure. For example, antennas 452a through 452r, processors 466, 458, 464, and/or controller/processor 480 of the UE 120. Antennas 434, processors 430, 420, 438, and/or controller/processor 440 of the BS 110 may be used to perform the operations described herein.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data from the data source 412 may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), the secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, digitize, etc.) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, the MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to the controller/processor 480. According to one or more cases, some aspects can include providing the antennas 452, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be located in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs 120 for data transmission on the downlink and/or uplink.

Figure 5A:
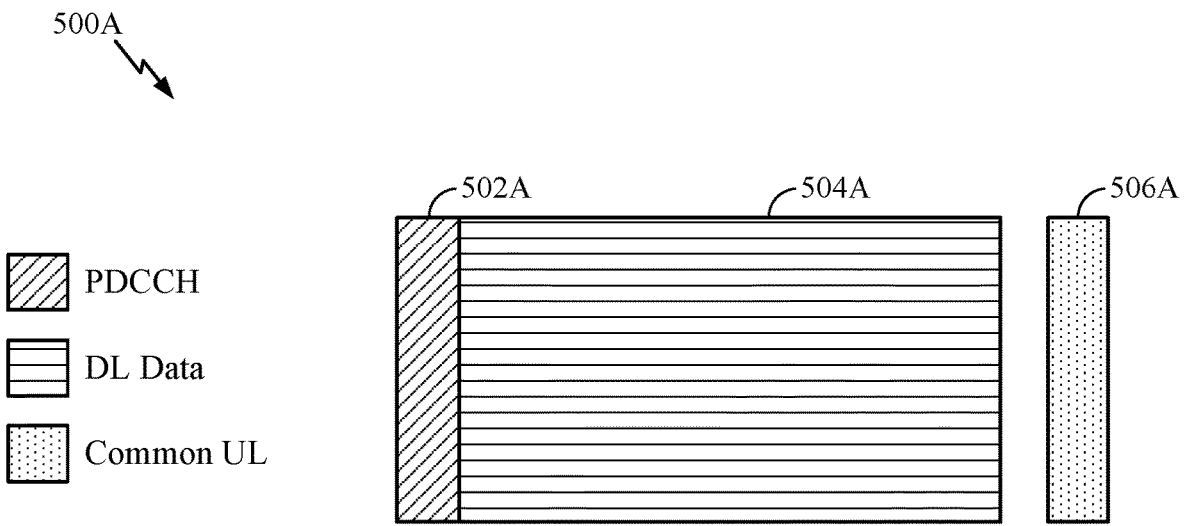
FIG. 5A is a diagram illustrating an exemplary downlink (DL)-centric subframe according to some aspects of the present disclosure.

FIG. 5A is a diagram showing an exemplary DL-centric subframe 500A. The DL-centric subframe 500A may include a control portion 502A, a DL data portion 504A, and a common UL portion 506A. The control portion 502A may exist in the initial or beginning portion of the DL-centric subframe 500A. The control portion 502A may include various scheduling information and/or control information corresponding to various portions of the DL-centric subframe 500A. In some configurations, the control portion 502A may be a PDCCH, as indicated by the legend shown in FIG. 5A.

The DL data portion 504A may sometimes be referred to as the payload of the DL-centric subframe 500A. The DL data portion 504A may include the communication resources utilized to communicate DL data from the scheduling entity such as the ANC 202 of FIG. 2 (e.g., eNB, BS, Node B, 5G NB, TRP, gNB, etc.) to the subordinate entity, e.g., UE 120. In some configurations, the DL data portion 504A may be a PDSCH.

The DL-centric subframe 500A may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe 500A. For example, the common UL portion 506A may include feedback information corresponding to the control portion 502A. Non-limiting examples of feedback information may include an acknowledge (ACK) signal, a negative acknowledge (NACK) signal, a HARQ indicator, and/or various other suitable types of information. The common UL portion 506A may include additional or alternative information, such as information pertaining to random access channel (RACH) procedures, scheduling requests (SRs), sounding reference signals (SRS), and various other suitable types of information.

As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation may provide time for the switchover from DL communication (e.g., reception operation by the subordinate entity, such as UE 120) to UL communication (e.g., transmission by the subordinate entity, such as UE 120). One of ordinary skill in the art will understand, however, that the foregoing is merely one example of a DL-centric subframe 500A and alternative structures having similar features may exist without necessarily deviating from the aspects described herein.

Figure 5B:
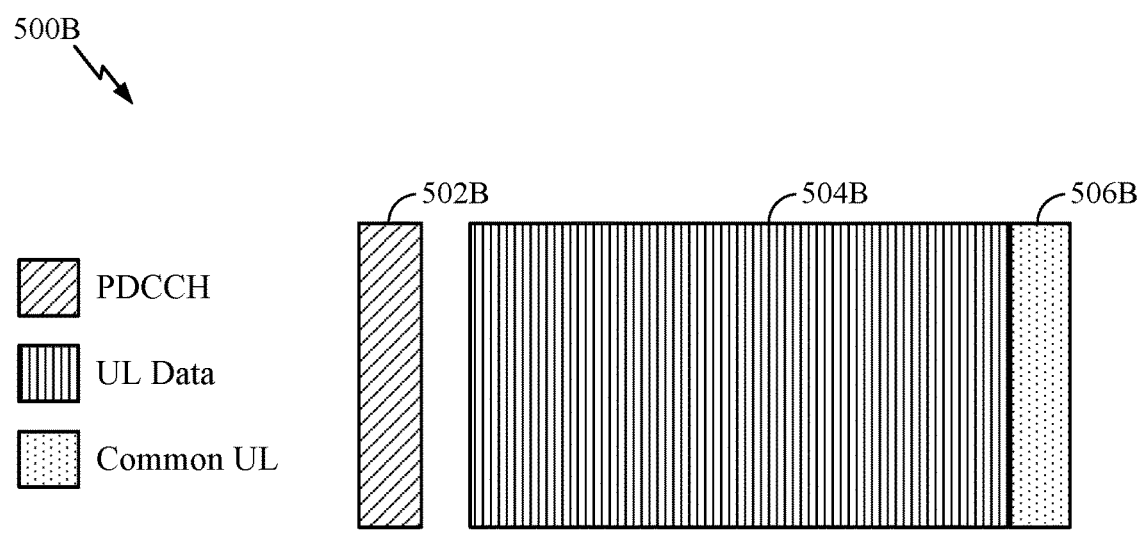
FIG. 5B is a diagram illustrating an exemplary uplink (UL)-centric subframe according to some aspects of the present disclosure.

FIG. 5B is a diagram showing an exemplary UL-centric subframe 500B. The UL-centric subframe 500B may include a control portion 502B, a UL data portion 504B, and a common UL portion 506B. The control portion 502B may exist in the initial or beginning portion of the UL-centric subframe 500B. The control portion 502B in FIG. 5B may be similar to the control portion 502A described above with reference to FIG. 5A. The UL data portion 504B may sometimes be referred to as the payload of the UL-centric subframe. The UL data portion 504B may refer to the communication resources utilized to communicate UL data from the subordinate entity, e.g., UE 120, to the scheduling entity (e.g., a BS 110 or ANC 202). In some configurations, the control portion 502B may be a PUSCH.

As illustrated in FIG. 5B, the end of the control portion 502B may be separated in time from the beginning of the UL data portion 504B. This time separation may sometimes be referred to as a gap, guard period, guard interval, and/or various other suitable terms. This separation may provide time for the switchover from DL communication (e.g., reception operation by the scheduling entity 202) to UL communication (e.g., transmission by the scheduling entity 202).

The common UL portion 506B in FIG. 5B may be similar to the common UL portion 506A described above with reference to FIG. 5A. The common UL portion 506B may additionally or alternatively include information pertaining to channel quality indicator (CQI), SRSs, and various other suitable types of information. One of ordinary skill in the art will understand that the foregoing is merely one example of an UL-centric subframe 500B and alternative structures having similar features may exist without necessarily deviating from the aspects described herein.

In summary, a UL-centric subframe 500B may be used for transmitting UL data from one or more mobile stations 120 to a base station 110, and a DL-centric subframe 500A may be used for transmitting DL data from the base station 110 to the one or more mobile stations 120. In one example, a frame may include both DL-centric subframes 500A and UL-centric subframes 500B. In such an example, the ratio of UL-centric subframes to DL-centric subframes in a frame may be dynamically adjusted based on the amount of uplink data and the amount of downlink data that needs to be transmitted. For example, if there is more uplink data than downlink data, then the ratio of UL-centric subframes to DL-centric subframes may be increased. Conversely, if there is more downlink data than uplink data, then the ratio of UL-centric subframes to DL-centric subframes may be decreased.

A flexible timeline is being introduced in NR where the UE indicates delays in terms of slots, K0/K1/K2, in the timeline. The delays, K0/K1/K2, can be conveyed in downlink control information (DCI). Techniques described herein may include the UE 120 indicating the DL feedback timing for UL transmissions (e.g., autonomous uplink (AUL) transmissions) or indicating the DL scheduling timing for UL transmissions. The indication can be conveyed in the uplink control information (UCI) in the PUCCH or in a scheduling request (SR).

The PUCCH carries the UCI. In some aspects, the UCI carries at least one of CQI, an SR, or HARQ ACK/NACK. DCI such as scheduling decisions and power-control commands is used to signal allocation of resources to the UE 120. For example, DCI may be used to schedule downlink resources on the PDSCH or uplink resources on the PUSCH. In addition, Transmit Power Control (TPC) commands may be signaled by the DCI for either the PUCCH or the PUSCH. The PDCCH is used to carry DCI.

AUL transmission was introduced in MulteFire, further enhanced licensed assisted (FeLAA), and NR. LAA was defined solely for the downlink in 3GPP Rel-13. Enhanced-Licensed Assisted Access (eLAA) was added in 3GPP Rel-14 and included uplink operation for LAA. In some cases, uplink transmissions in unlicensed spectrum (e.g., in LTE-U or LAA) may be scheduled by a BS 110. An uplink grant may indicate scheduled resources to be used by a UE 120 for uplink transmission.

One goal of the present method and apparatus is to improve channel utilization by reducing uplink transmission delay (or latency) for a UE 120 in the unlicensed spectrum by not having to rely on a BS 110 to have access to the wireless medium in order to assign a grant to the UE 120. In one aspect, the BS 110 does not have to assign one or more uplink grants before one or more UEs 120 can use that wireless medium for uplink transmissions. The UE 120 can transmit on an AUL without having received an uplink grant.

Typically, if a UE 120 is not scheduled with an uplink grant for a while, the UE 120 will submit a scheduling request in order to get scheduled in uplink when new data arrives. Using AULs may reduce uplink transmission delay (or latency) because the UE will not have to send an SR before sending data, reports, or control signals on the uplink. A UE 120 uses an SR to request resource allocation in the uplink so the UE 120 can send data.

A UE 120 operating in unlicensed spectrum may determine that a BS 110 is not transmitting during a particular time period (e.g., by detecting the absence of a control signal or a preamble). Meanwhile, the UE 120 may also perform an LBT procedure and, if the channel is available, may perform an AUL transmission. The AUL transmission may include control information to facilitate decoding at a BS 110. Thus, the BS 110 may receive the control information, and decode the rest of the AUL transmission accordingly. The BS 110 may configure the UE for AUL transmissions when the radio link is established, and may also send dynamic configuration information to initiate, suspend, or reconfigure parameters for AUL transmissions. This is shown in FIG. 6 which illustrates a method for AUL transmission in unlicensed spectrum.

Figure 6:
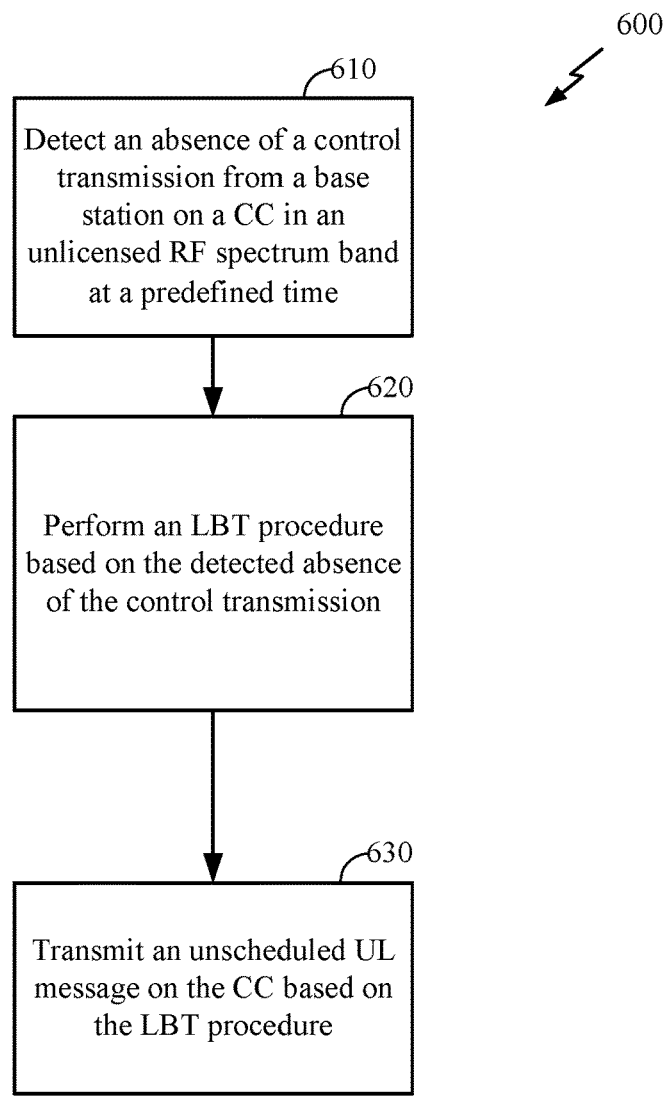
FIG. 6 illustrates a method for autonomous UL transmission in unlicensed spectrum, in accordance with certain aspects of the present disclosure.

FIG. 6 illustrates a method 600 for autonomous UL transmission in an unlicensed spectrum, in accordance with certain aspects of the present disclosure. The operations of method 600 may be implemented by a device such as a UE 120 or its components as described with reference to FIG. 1. For example, the operations of method 600 may be performed by an AUL manager as described herein. In some aspects, the UE 120 may execute a set of codes to control the functional elements of the device to perform the functions described below.

At block 610, the UE 120 may detect an absence of a control transmission from a base station on a CC in an unlicensed spectrum band at a predefined time.

At block 620, the UE 120 may perform an LBT procedure based on the detected absence of the control transmission. In certain aspects, the operations of block 620 may be performed by an LBT component. At block 630, the UE 120 may transmit an unscheduled UL message on the CC based on the LBT procedure.

UEs 120 or base stations 110 operating in shared or unlicensed frequency spectrum may perform an LBT procedure such as a CCA prior to communicating in order to determine whether the channel is available. A CCA may include an energy detection procedure to determine whether there are any other active transmissions. For example, the device may infer that a change in a received signal strength indicator (RSSI) of a power meter indicates that a channel is occupied. Specifically, signal power that is concentrated in a certain bandwidth and exceeds a predetermined noise floor may indicate another wireless transmitter is actively using the CC. A CCA may also include detection of specific sequences that indicate use of the channel. For example, another device may transmit a specific preamble prior to transmitting a data sequence.

For AUL transmission, the downlink feedback (which indicates if the AUL transmission was received) could be conveyed either in DCI or autonomous UL-DL feedback information (AUL-DFI). AUL-DFI was introduced in FeLAA/MulteFire to send DL feedback in response to an AUL transmission. In FeLAA/MulteFire, it is assumed that the AUL-DFI has a bitmap which maps a bit to each HARQ processes allocated to the AUL. It is assumed that each DL feedback is going to have a position for each HARQ which represents an ACK or a NACK. A bit map is a mapping from some domain (almost always a range of integers) to values in the set {0, 1}. Here, in one example, the values can be interpreted as ACK/NACK where ACK is "1" and NACK is "0." Also, the default ACK/NACK value may be NACK. A new data indicator (NDI) in the DCI can also be used to provide feedback. If the new data indicator toggles, it means the previous transmission was received correctly and the next transmission is new data.

HARQ may be a method of ensuring that data is received correctly over a wireless communication link. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link. In some cases, UL control messages including HARQ information may be transmitted autonomously by a UE 120. HARQ process may also be configured in autonomous (e.g., unscheduled) UL transmissions. When a UE 120 transmits autonomous UL messages, the transmissions may include UCI that contain parameters similar to those included in DCI because the receiving base station 110 may use the UCI to facilitate decoding of the message.

In some aspects, a base station 110 may configure a UE 120 with parameters for autonomous UL transmission. In some aspects, an RRC message may contain indications and parameter configuration information. Further, parameters may include a maximum number of subframes that may be transmitted autonomously, in addition to an identification of subframes on which a UE may contend for autonomous UL transmissions (e.g., even subframes, odd subframes, once every N slots, etc.).

Presently in LTE, the UE interprets the AUL-DFI based on a 4 ms processing timeline. That is, it will be assumed that there may be a delay (e.g., a minimum 4 ms gap) between the UL grant and the UL transmission. That is, all the outstanding HARQ processes less than 4 ms will be deemed pending and will be populated in the next AUL-DFI instead of being treated as NACKs. Without DFI, the BS 110 can always send a new transmission DCI or a retransmission DCI which implicitly conveys the ACK/NACK information.

Flexible timelines were introduced in NR. Instead of using a fixed 4 ms processing time, a UE 120 is allowed to have different timelines depending on the UE category. In one example, the BS 110 indicates the timeline in a DCI sent to the UE.

The present method and apparatus focuses on the UE indicated timeline for AUL transmissions. The UE 120 indicates the timeline for AUL transmissions to the BS 110.

Figure 7:
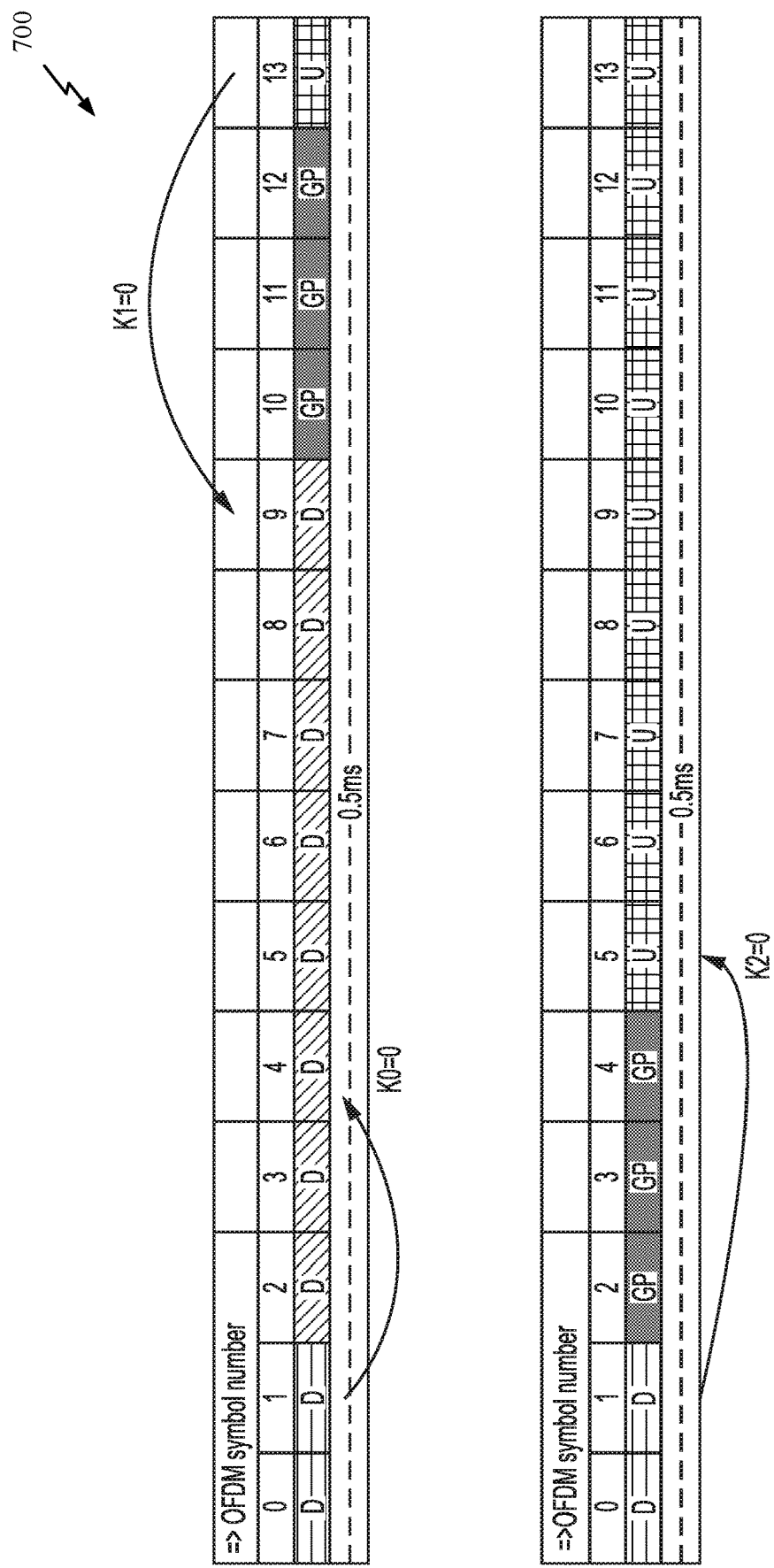
FIG. 7 discloses timing relation definitions for HARQ operations in NR, in accordance with certain aspects of the present disclosure.

FIG. 7 discloses timing relation definitions 700 for HARQ operations in NR where K0 to K2 represents delays measured in slots. K0 is the delay in slots between a downlink grant and a corresponding downlink data (e.g., PDSCH) reception. After the downlink grant, the downlink data is transmitted. K1 is the delay in slots between downlink data (e.g., PDSCH) reception and a corresponding ACK transmission on the uplink. In one example, the transmitted PDSCH is in the same slot as the ACK. K2 is the delay in slots between an uplink grant reception in the downlink and an uplink data (e.g., PUSCH) transmission.

K0, K1, and K2 can be indicated to a UE dynamically by L1 DL signaling. K0, K1, and K2 can be indicated to a UE by the DCI in the PDCCH. In NR, the HARQ timeline is indicated by gNB based on UE capability where the UE 120 signals its downlink processing time based on the UE category and the BS 110 indicates a corresponding timing relation accordingly.

In one example, there is no fixed timing relationship between uplink transmission and downlink signaling. The UE 120 is not aware when the BS 110 sends a DFI or DCI in response to receiving an AUL transmission (e.g., PUSCH) to indicate to the UE whether the PUSCH was correctly received or not. After the UE 120 sends an AUL PUSCH, the UE 120 will keep monitoring the PDCCH for either the DCI or the DFI until the timer expires to know whether it should retransmit the previous packet or start a new packet on the AUL resources. The timer has to be set at least no less than the BS 110 UL processing time. Additional margin can be included in the timer to allow BS transmission or scheduling flexibility as well as the medium access uncertainty. In one example, the timer will be configured by the BS 110. If the UE 120 receives feedback before timer expires, the UE 120 can stop monitoring even if there is remaining time in the timer.

In order to reduce power consumption by the UE 120, when the UE 120 is not sending delay sensitive traffic on the AUL, the UE 120 may not want to keep monitoring the DL DCI or DL DFI after it transmits PUSCH. Note that this concept is equally applicable for the UE 120 in the DRX mode in addition to the UE 120 during AUL transmission. With discontinuous transmission, communication to a receiver over a channel does not occur continuously but may be cycled on and off. In the DRX mode, the UE 120 may save power by not monitoring the PDCCH in a given subframe.

Figure 8:
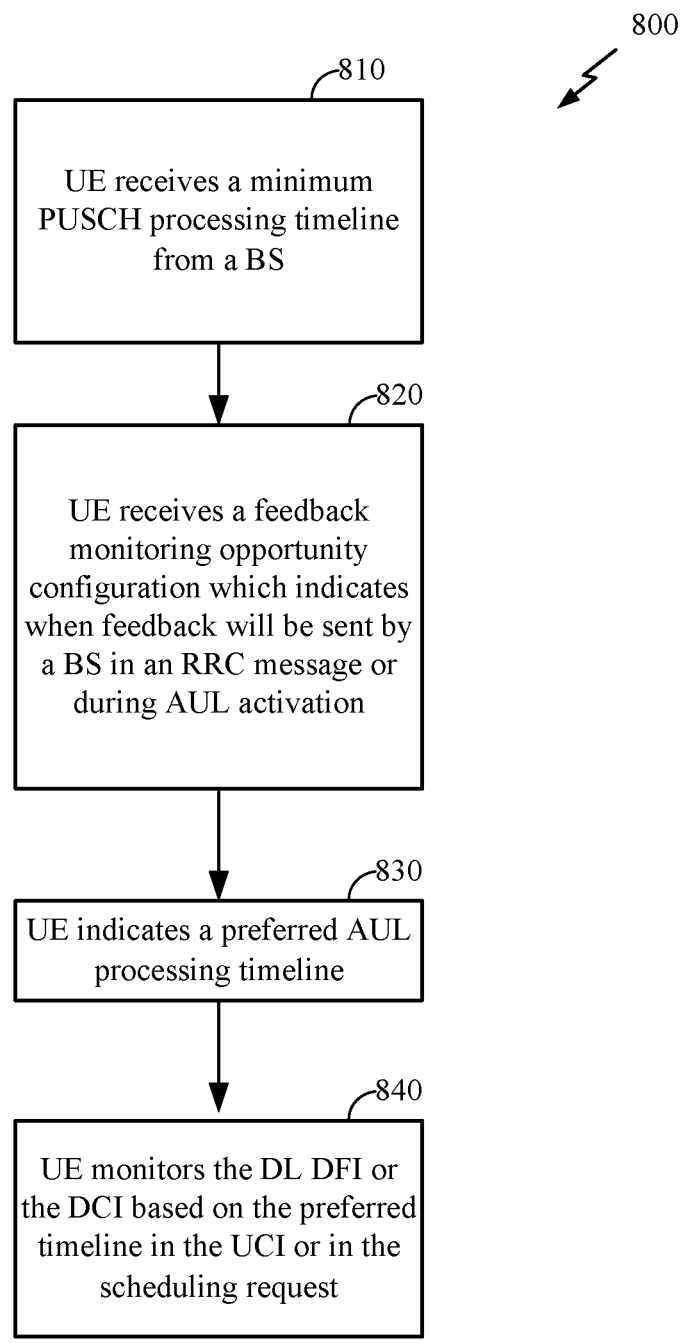
FIG. 8 is a flowchart which illustrates a method of a UE for sending AUL traffic during a UE indicated timeline, in accordance with certain aspects of the present disclosure.

FIG. 8 is a flowchart which illustrates a method 800 of a UE 120 for sending AUL traffic during a UE indicated timeline, in accordance with certain aspects of the present disclosure. In step 810, the BS 110 indicates the minimum PUSCH processing timeline to the UE 120 in an RRC message, or during AUL activation. In another example, the minimum PUSCH processing time can be predefined. In yet another example, the minimum PUSCH processing time is not either predefined or indicated to UE. In this case, the minimum processing timeline could be considered to be as small as zero. At optional block 820, the BS 110 may further configure DFI or DCI monitoring opportunities for the UE 120, where the UE 120 receives feedback monitoring opportunity configurations which indicate when DFI or DCI feedback will be sent after the BS 110 has processed the AUL transmission. The allowed timeline configurations can be indicated by the BS 110 in an RRC message or in the AUL activation command where the activation command can be carried in the DFI or DCI.

Block 820 illustrates an example where the UE receives a feedback monitoring opportunity configuration, and selects a timeline for when feedback like a DCI or a DFI is sent. For example, the feedback monitoring opportunity configuration may include the following: i) the UE keeps monitoring for DCI or DFI after it transmits a transmission associated with a UL HARQ process; ii) the UE obtains an ACK/NACK for all AUL PUSCH HARQ processes together, e.g., after all HARQ processes have been processed. For this timeline, the UE monitors for one feedback response for all the HARQ processes, and thus may not monitor DCI or DFI for individual HARQ processes; or iii) the UE wakes up on the next DRX ON duration to monitor the feedback (e.g., the DCI or the DFI).

The BS 110 may configure an additional grid for UE 120 to monitor for DCI or DFI corresponding to an AUL transmission. The DCI/DFI monitoring grid can be denser than the DRX cycle. For example, BS 110 may configure UE 120 to wake up every half DRX cycle to monitor DFI/DCI. The UE 120 monitors the additional grid for feedback such as DCI or DFI when it sends data (such as a PUSCH) during an AUL transmission. This could be more useful for connected DRX mode.

In block 830, the UE indicates the preferred AUL processing timeline in the allowed set of processing timelines (e.g., in the feedback monitoring opportunity configuration). The allowed set could include: monitor DL DCI/DFI after each UL transmission; monitor DL DCI/DFI after all HARQ processes are done; monitor DL DCI/DFI in the next DRX ON duration; monitor DL DCI/DFI in the next configured period, etc. Effectively, the UE 120 indicates to the BS 110 when to send feedback such as DFI for AUL downlink feedback or when to send a DCI for subsequent new transmission or retransmission where the DCI is used to signal allocation of resources to the UE 120.

The timeline selected by the UE 120 may depend on the UE's implementation. For example, if the traffic is delay sensitive, the UE may pick the first choice: the UE keeps monitoring DCI or DFI after it transmits a UL packet. That is, for delay sensitive traffic, the UE 120 may select a timeline in which the BS 110 can send feedback to the UE 120 right away. On the other hand, if the traffic is not delay sensitive, the UE can pick the third choice: the UE wakes up on the next DRX ON duration to monitor for DCI or DFI. Here, the BS 110 will send feedback to the UE on the next DRX ON cycle. In this case, the UE 120 doesn't need feedback right away because the data is not delay sensitive. In some cases, the UE 120 may select obtaining ACK/NACK for all AUL PUSCH HARQ processes together when traffic is between delay sensitive and not delay sensitive.

Note that UCI in FeLAA/MF may support fields for the UE to convey HARQ id, NDI and redundancy version (RV). In the present method and apparatus, a timeline field may also be included in the UCI.

In another example, the UCI may also include some form of SR in order for the BS 110 to schedule subsequent transmissions.

Additionally or alternatively, the indication from the UE 120 to the BS 110 when to send DFI for AUL downlink feedback or when to send a DCI for a subsequent new transmission or retransmission may be associated with an UL buffer status and/or an UL traffic Quality of Service (QoS).

The indication from the UE 120 to the BS 110 when to send DFI for AUL downlink feedback or when to send a DCI for a subsequent new transmission or retransmission can also be combined with a SR indication in the UCI. In another example, the SR could include an additional timeline field to carry the indication for the selected timeline for the subsequent UL grant when the UCI is not present (for example, with a scheduled UL transmission).

In block 840, based on the selected timeline (e.g., in the UCI or the SR), the UE monitors for the DL feedback (e.g., DFI or DCI) accordingly.

The proposal may be complementary to a BS 110 indicating $K_0$, $K_1$ and $K_2$ in a PDCCH. Here the UE 120 indicates the timeline when it expects to monitor DFI or DCI which contains an ACK/NACK and/or scheduling information from the BS 110. The PUSCH is received by the BS 110 and DFI/DCI feedback is sent according to the AUL-DFI/DCI transmission timeline signaled in the UCI from the UE 120. The proposal can work for both AUL or scheduled UL (SUL) where the timing indication can be signaled either in the UCI or in the scheduling request.

Figure 9:
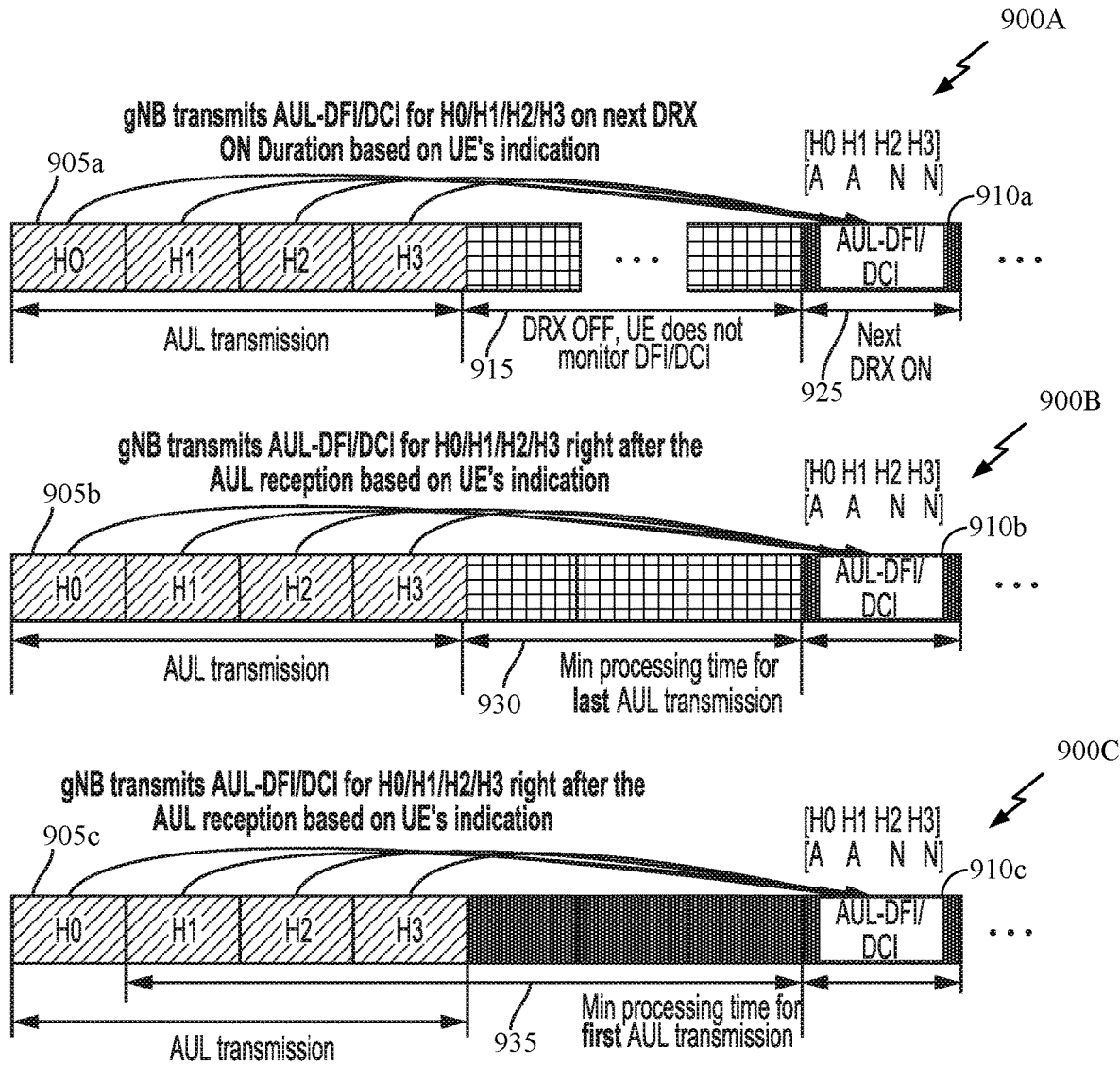
FIG. 9 illustrates three exemplary AUL timelines that may be selected by a UE, in accordance with certain aspects of the present disclosure.

FIG. 9 illustrates three exemplary AUL timelines 900 that may be selected by a UE 120, in accordance with certain aspects of the present disclosure. The UE 120 indicates the selected AUL timeline along with its AUL transmission times to the BS 110 and the BS 110 transmits DFI/DCI accordingly.

In FIG. 9, for each AUL timeline 900 there are four HARQ processes, H0 to H3. Each HARQ process has corresponding HARQ feedback, where A represents ACK and N represents NACK. For AUL timeline 900A, the BS 110 transmits AUL-DFI/DCI feedback 910a for the four H0/H1/H2/H3 HARQ processes 905a at the next DRX ON duration 925. After the transmission is done, the UE goes to sleep. During DRX OFF period 915, the UE 120 may remain in sleep and does not monitor the DFI/DCI feedback. The UE 120 wakes up to monitor for the feedback during the next DRX "ON" duration 925.

For AUL timeline 900B, the BS 110 transmits AUL-DFI/DCI feedback 910b for the four H0/H1/H2/H3 HARQ processes 905b. The UE 120 monitors for the AUL-DFI/DCI feedback 910b after the minimum processing time 930 for its last AUL transmission. When the minimum processing time is not available to UE 120 (e.g., has not been configured), UE 120 may monitor the DFI/DCI feedback after its last AUL transmission. In this case, the UE will not monitor the feedback from the BS 110 until all HARQ processes are completed. Thus, the traffic being monitored by the UE on this timeline may be less time sensitive. For AUL timeline 900B, UE 120 may monitor the DFI/DCI after the minimum processing time for its last AUL transmission when a minimum processing time is available, otherwise, it may monitor the DFI/DCI after its last AUL transmission.

For AUL timeline 900C the BS 110 transmits AUL-DFI/DCI feedback 910c for the four H0/H1/H2/H3 HARQ processes 905c. The UE 120 may monitor for the AUL-DFI/DCI feedback 910c after a minimum processing time 935 for its first AUL transmission. When the minimum processing time is not available to UE, UE may monitor for the DFI/DCI feedback after its first AUL transmission. This timeline is directed at handling more time sensitive traffic where the UE 120 monitors the feedback as quickly as it can.

Figure 10:
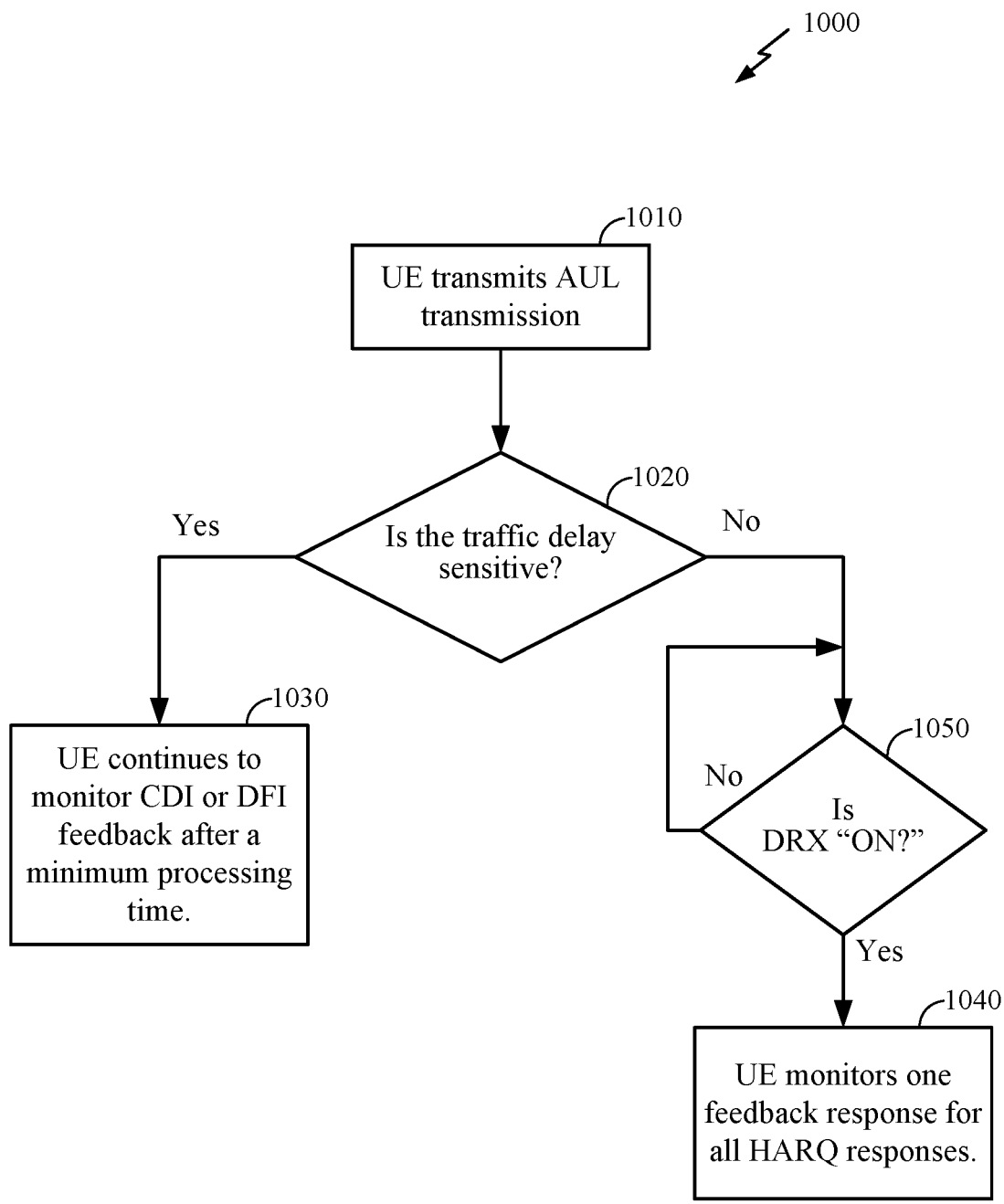
FIG. 10 is a flowchart of a method supporting timeline selection for feedback monitoring opportunities, in accordance with certain aspects of the present disclosure.

FIG. 10 is a flowchart of a method 1000 supporting timeline selection for feedback monitoring opportunities, in accordance with certain aspects of the present disclosure. Method 1000 may begin at block 1010, where a UE 120 may transmit one or more AUL transmissions (e.g., within a burst associated with one or more HARQ processes). In the next step, step 1020, the UE determines what type of traffic is associated with the feedback for which it will monitor, traffic that is delay sensitive or not delay sensitive. If the traffic is delay sensitive, then in step 1030, the UE 120 continues monitoring DCI or DFI after the minimum processing time of the first HARQ process. When the minimum processing time is not available to UE 120, UE 120 will monitor the DFI/DCI after the first HARQ process of the one or more AUL transmissions. This timeline is directed at handling time sensitive traffic where the BS 110 sends the feedback as quickly as it can.

If the traffic is not delay sensitive, then the UE 120 will not monitor the feedback from the BS 110 until all HARQ processes are completed and obtains an ACK/NACK for all AUL PUSCH HARQ processes together. That is, after all HARQ processes have been processed, the UE 120 monitors for one feedback response for all the HARQ processes at block 1040. In some cases, it monitors for the DFI/DCI after the minimum processing time for its last AUL transmission. Alternatively, in step 1050, the UE 120 determines if DRX is "ON." If the answer is no, e.g., DRX is "OFF," then the UE 120 does not monitor the DFI/DCI feedback. If the answer is yes, e.g., DRX is "ON," the DFI/DCI traffic may be monitored. In some examples, the method 1000 may include the UE selecting the timeline for monitoring for feedback from a set of timelines (e.g., in a feedback monitoring opportunity configuration).

Figure 11:
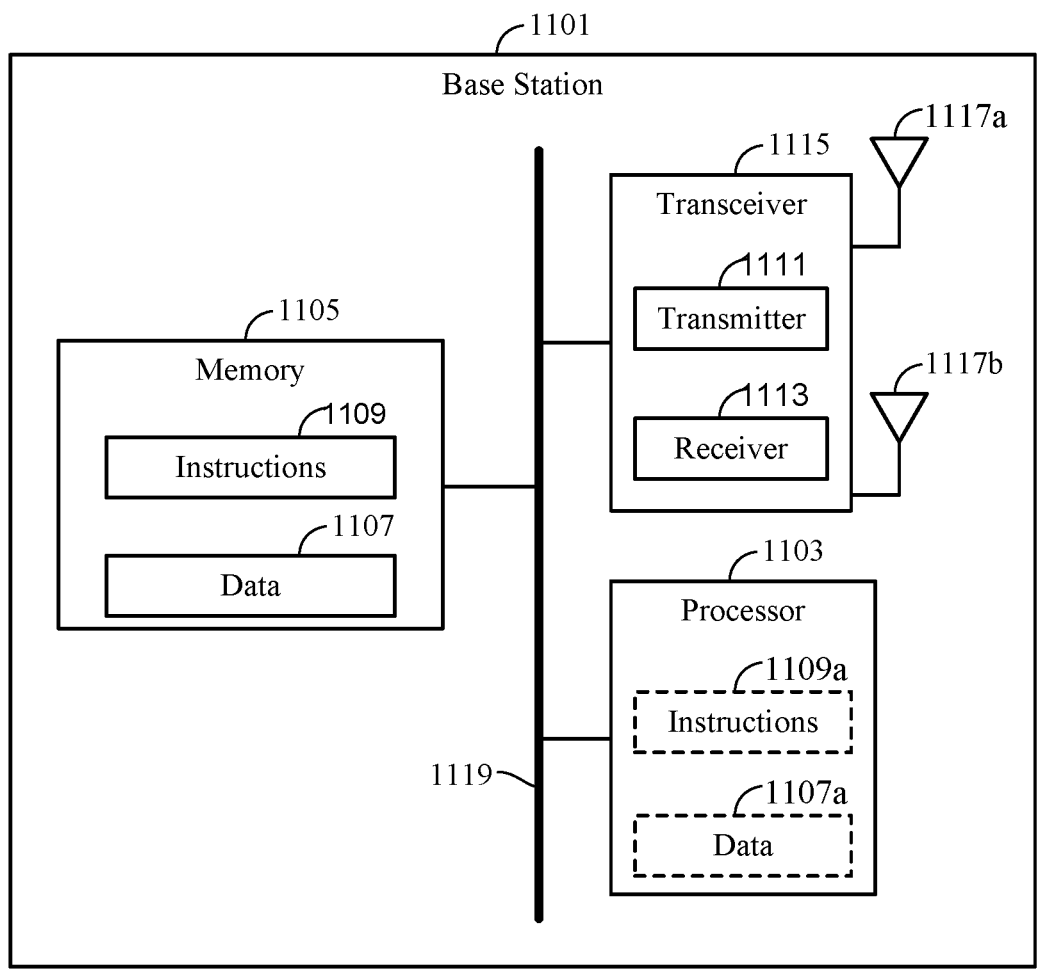
FIG. 11 illustrates certain components that may be included within a base station supporting timeline selection for feedback monitoring opportunities, in accordance with certain aspects of the present disclosure.

FIG. 11 illustrates certain components that may be included within a base station 1101 supporting timeline selection for feedback monitoring opportunities, in accordance with certain aspects of the present disclosure. The base station 1101 may be an access point, a NodeB, an evolved NodeB, etc. The base station 1101 includes a processor 1103. The processor 1103 may be a general purpose single- or multi-chip microprocessor (e.g., a reduced instruction set computing (RISC) or complex instruction set computing (CISC)), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1101 of FIG. 11, in an alternative configuration, a combination of processors (e.g., a CPU and DSP) could be used.

The base station 1101 also includes memory 1105. The memory 1105 may be any electronic component capable of storing electronic information. The memory 1105 may be embodied as random-access memory (RAM), read only memory (ROM), magnetic disk storage media, optical storage media, flash memory devices in RAM, on-board memory included with the processor, erasable programmable ROM (EPROM) memory, electrically erasable programmable ROM (EEPROM) memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The base station 1101 may also include a transmitter 1111 and a receiver 1113 to allow transmission and reception of signals to and from the base station 1101. The transmitter 1111 and receiver 1113 may be collectively referred to as a transceiver 1115. Multiple antennas 1117a-b may be electrically coupled to the transceiver 1115. The base station 1101 may also include (not shown) multiple transmitters, multiple receivers and/or multiple transceivers.

The various components of the base station 1101 may be coupled together by one or more buses, which may include a power bus, a control signal bus, a status signal bus, a data bus, etc. For the sake of clarity, the various buses are illustrated in FIG. 11 as a bus system 1119. Although FIGS. 8 and 10 was discussed with reference to a UE, it should be understood that a base station, such as base station 1101, may perform the corresponding transmitting that is received and monitored by the UE as well as the receiving of the information indicated by the UE discussed in FIGS. 8 and 10. And may be implemented in hardware, software executed by a processor like the processor 1103 described in FIG. 11.

Figure 12:
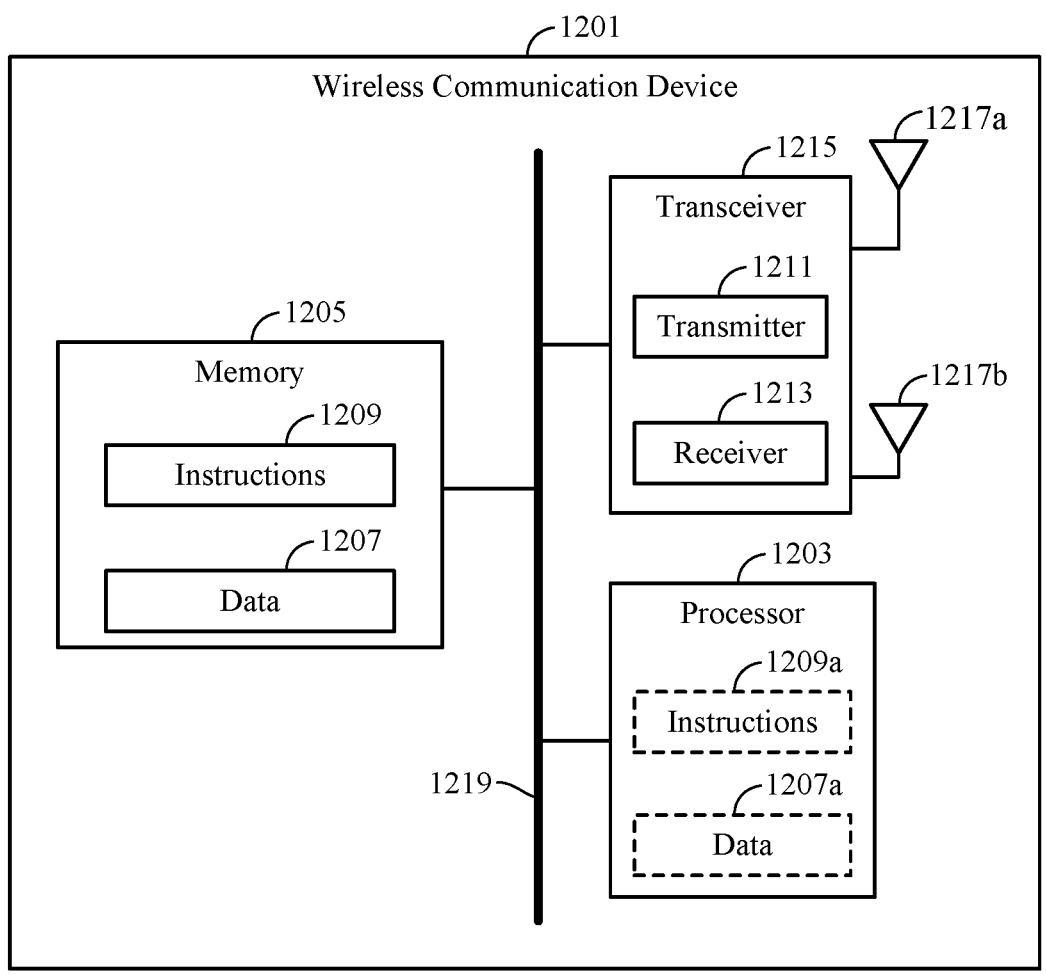
FIG. 12 illustrates certain components that may be included within a wireless communication device supporting timeline selection for feedback monitoring opportunities, in accordance with certain aspects of the present disclosure.

FIG. 12 illustrates certain components that may be included within a wireless communication device 1201 supporting timeline selection for feedback monitoring opportunities, in accordance with certain aspects of the present disclosure. The wireless communication device 1201 may be an access terminal, a mobile station, a UE, etc. The wireless communication device 1201 includes a processor 1203. The processor 1203 may be a general-purpose single- or multi-chip microprocessor (e.g., RISC or CISC), a special purpose microprocessor (e.g., a DSP), a microcontroller, a programmable gate array, etc. The processor 1203 may be referred to as a CPU. Although just a single processor 1203 is shown in the wireless communication device 1201 of FIG. 12, in an alternative configuration, a combination of processors (e.g., a CPU and DSP) could be used.

The wireless communication device 1201 also includes memory 1205. The memory 1205 may be any electronic component capable of storing electronic information. The memory 1205 may be embodied as RAM, ROM, magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The wireless communication device 1201 may also include a transmitter 1211 and a receiver 1213 to allow transmission and reception of signals to and from the wireless communication device 1201. The transmitter 1211 and receiver 1213 may be collectively referred to as a transceiver 1215. Multiple antennas 1217a, 1217b may be electrically coupled to the transceiver 1215. The wireless communication device 1201 may also include (not shown) multiple transmitters, multiple receivers and/or multiple transceivers.

The various components of the wireless communication device 1201 may be coupled together by one or more buses, which may include a power bus, a control signal bus, a status signal bus, a data bus, etc. For the sake of clarity, the various buses are illustrated in FIG. 12 as a bus system 1219. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive. The functions described herein in the flowcharts of FIGS. 8 & 10 may be implemented in hardware, software executed by a processor like the processor 1203 described in FIG. 12.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), Institute of Electrical and Electronics Engineers (IEEE) 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communication system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communications at a user equipment (UE), comprising:
    receiving, by the UE, a feedback monitoring opportunity configuration that identifies a set of uplink processing timelines for a base station to process each of a plurality of uplink transmissions, wherein the set comprises two or more uplink processing timelines, and wherein each uplink processing timeline of the two or more uplink processing timelines identifies a different time duration between each of the plurality of uplink transmissions in a physical uplink shared channel (PUSCH) slot and respective feedback from the base station, wherein the feedback is associated with each of the plurality of uplink transmissions;
    transmitting, by the UE, an indication of a first uplink processing timeline, wherein the first uplink processing timeline is selected from the set of uplink processing timelines;
    transmitting, by the UE, an uplink transmission of the plurality of uplink transmissions to the base station; and
    monitoring, by the UE, for the respective feedback from the base station associated with the uplink transmission based at least in part on the first uplink processing timeline.

2. The method of claim 1, wherein the uplink transmission is an autonomous uplink (AUL) transmission or a scheduled uplink (SUL) transmission.

3. The method of claim 1, wherein the feedback monitoring opportunity configuration is received in a Radio Resource Control (RRC) message or in an autonomous uplink (AUL) transmission activation command.

4. The method of claim 1, wherein the indication of the first uplink processing timeline is transmitted in Uplink Control Information (UCI) or in a scheduling request.

5. The method of claim 1, further comprising:
    receiving the feedback in downlink feedback information (DFI) or downlink control information (DCI) based at least in part on the monitoring.

6. The method of claim 1, wherein monitoring for the respective feedback further comprises:
    monitoring, by the UE, for the respective feedback during a Discontinuous Reception (DRX) ON cycle.

7. The method of claim 1, wherein monitoring for the respective feedback further comprises:
    monitoring, by the UE, for the respective feedback after a first hybrid automatic repeat request (HARQ) process of the uplink transmission.

8. The method of claim 1, wherein monitoring for the respective feedback further comprises:
    monitoring, by the UE, for the respective feedback after a last hybrid automatic repeat request (HARQ) process of the uplink transmission.

9. The method of claim 1, wherein the set of uplink processing timelines comprises:
    waking up, by the UE, at a next Discontinuous Reception (DRX) ON duration to monitor for the respective feedback;
    waking up, by the UE, at a configured period to monitor for the respective feedback;
    monitoring, by the UE, for the respective feedback after a processing time of a first hybrid automatic repeat request (HARQ) process is complete; or
    monitoring, by the UE, for autonomous uplink (AUL) downlink feedback information (DFI) that includes at least one ACK/NACK for a plurality of physical uplink shared channel (PUSCH) HARQ processes.

10. The method of claim 1, wherein monitoring for the respective feedback further comprises:
    monitoring, by the UE, for the respective feedback based at least in part a minimum physical uplink shared channel (PUSCH) processing timeline.

11. The method of claim 10, further comprising:
    receiving, by the UE, the minimum PUSCH processing timeline during an autonomous uplink activation.

12. The method of claim 10, wherein the minimum PUSCH processing timeline is predefined.

13. The method of claim 10, further comprising:
    receiving, by the UE, the minimum PUSCH processing timeline in a radio resource control (RRC) message from the base station.

14. The method of claim 1, further comprising:
    selecting, by the UE, the first uplink processing timeline based at least in part on a delay sensitivity of the uplink transmission.

15. An apparatus for wireless communications at a user equipment (UE), comprising:
    means for receiving, by the UE, a feedback monitoring opportunity configuration that identifies a set of uplink processing timelines for a base station to process each of a plurality of uplink transmissions, wherein the set comprises two or more uplink processing timelines, and wherein each uplink processing timeline of the two or more uplink processing timelines identifies a different time duration between each of the plurality of uplink transmissions in a physical uplink shared channel (PUSCH) slot and respective feedback from the base station, wherein the feedback is associated with each of the plurality of uplink transmissions;

means for transmitting an indication of a first uplink processing timeline, wherein the first uplink processing timeline is selected from the set of uplink processing timelines;

means for transmitting an uplink transmission of the plurality of uplink transmissions to the base station; and means for monitoring for the respective feedback from the base station associated with the uplink transmission based at least in part on the first uplink processing timeline.

16. The apparatus of claim 15, wherein the uplink transmission is an autonomous uplink (AUL) transmission or a scheduled uplink (SUL) transmission.

17. The apparatus of claim 15, wherein the feedback monitoring opportunity configuration is received in a Radio Resource Control (RRC) message or in an autonomous uplink (AUL) transmission activation command.

18. The apparatus of claim 15, wherein the first uplink processing timeline is transmitted in Uplink Control Information (UCI) or in a scheduling request.

19. The apparatus of claim 15, further comprising:
means for receiving the feedback in downlink feedback information (DFI) or downlink control information (DCI) based at least in part on the monitoring.

20. The apparatus of claim 15, wherein the means for monitoring for the respective feedback monitors for the respective feedback during a Discontinuous Reception (DRX) ON cycle.

21. The apparatus of claim 15, wherein the means for monitoring for the respective feedback monitors for the respective feedback after a first hybrid automatic repeat request (HARQ) process of the uplink transmission.

22. The apparatus of claim 15, wherein the means for monitoring for the respective feedback monitors for the respective feedback after a last hybrid automatic repeat request (HARQ) process of the uplink transmission.

23. The apparatus of claim 15, wherein the set of uplink processing timelines comprises:
waking up, by the UE, at a next Discontinuous Reception (DRX) ON duration to monitor for the respective feedback;
waking up, by the UE, at a configured period to monitor for the respective feedback;
monitoring, by the UE, for the respective feedback after a processing time of a first hybrid automatic repeat request (HARQ) process is complete; or
monitoring, by the UE, for an autonomous uplink (AUL) downlink feedback information (DFI) that includes at least one ACK/NACK for a plurality of physical uplink shared channel (PUSCH) HARQ processes.

24. The apparatus of claim 15, wherein the means for monitoring for the respective feedback monitors for the respective feedback based at least in part on a minimum physical uplink shared channel (PUSCH) processing timeline.

25. The apparatus of claim 24, further comprising:
means for receiving, by the UE, the minimum PUSCH processing timeline during an autonomous uplink activation.

26. The apparatus of claim 24, wherein the minimum PUSCH processing timeline is predefined.

27. The apparatus of claim 24, further comprising:
means for receiving, by the UE, the minimum PUSCH processing timeline in a radio resource control (RRC) message from the base station.

28. The apparatus of claim 15, further comprising:
means for selecting, by the UE, the first uplink processing timeline based at least in part on a delay sensitivity of the uplink transmission.

29. An apparatus for wireless communications, comprising:
a memory; and
at least one processor coupled to the memory, configured to:
receive a feedback monitoring opportunity configuration that identifies a set of uplink processing timelines for a base station to process each of a plurality of uplink transmissions, wherein the set comprises two or more uplink processing timelines and wherein each uplink processing timeline of the two or more uplink processing timelines identifies a different time duration between each of the plurality of uplink transmissions in a physical uplink shared channel (PUSCH) slot and respective feedback from the base station, wherein the feedback is associated with each of the plurality of uplink transmissions;
transmit an indication of a first uplink processing timeline, wherein the first uplink processing timeline is selected from the set of uplink processing timelines;
transmit an uplink transmission of the plurality of uplink transmissions to the base station; and
monitor for the respective feedback from the base station associated with the uplink transmission based at least in part on the first uplink processing timeline.

30. The apparatus of claim 29, wherein the uplink transmission is an autonomous uplink (AUL) transmission or a scheduled uplink (SUL) transmission.

31. The apparatus of claim 29, wherein the feedback monitoring opportunity configuration is received in a Radio Resource Control (RRC) message or in an autonomous uplink (AUL) transmission activation command.

32. The apparatus of claim 31, wherein the at least one processor is further configured to:
select the first uplink processing timeline based at least in part on a delay sensitivity of the uplink transmission.

33. The apparatus of claim 29, wherein the at least one processor is further configured to:
transmit the indication of the first uplink processing timeline in Uplink Control Information (UCI) or in a scheduling request.

34. The apparatus of claim 29, wherein the at least one processor is further configured to:
receive the feedback in downlink feedback information (DFI) or downlink control information (DCI) based at least in part on the monitoring.

35. The apparatus of claim 29, wherein the at least one processor is further configured to:
monitor for the respective feedback during a Discontinuous Reception (DRX) ON cycle.

36. The apparatus of claim 29, wherein the at least one processor is further configured to:
monitor for the respective feedback after a first hybrid automatic repeat request (HARQ) process of the uplink transmission.

37. The apparatus of claim 29, wherein the at least one processor is further configured to:
  monitor for the respective feedback after a last hybrid automatic repeat request (HARQ) process of the uplink transmission.

38. The apparatus of claim 29, wherein the set of uplink processing timelines comprises:
  wake up at a next Discontinuous Reception (DRX) ON duration to monitor for the respective feedback;
  wake up at a configured period to monitor for the respective feedback;
  monitor for the respective feedback after a processing time of a first hybrid automatic repeat request (HARQ) process is complete; or
  monitor for an autonomous uplink (AUL) downlink feedback information (DFI) that includes at least one ACK/NACK for a plurality of physical uplink shared channel (PUSCH) HARQ processes.

39. The apparatus of claim 29, wherein the at least one processor is further configured to:
  monitor for the respective feedback based at least in part a minimum physical uplink shared channel (PUSCH) processing timeline.

40. The apparatus of claim 39, wherein the at least one processor is further configured to:
  receive the minimum PUSCH processing timeline during an autonomous uplink activation.

41. The apparatus of claim 39, wherein the minimum PUSCH processing timeline is predefined.

42. The apparatus of claim 39, wherein the at least one processor is further configured to:
  receive the minimum PUSCH processing timeline in a radio resource control (RRC) message from the base station.

43. A non-transitory computer-readable medium having instructions stored thereon, the instructions comprising codes executable by an apparatus to:
  receive a feedback monitoring opportunity configuration that identifies a set of uplink processing timelines for a base station to process each of a plurality of uplink transmissions, wherein the set comprises two or more uplink processing timelines, and wherein each uplink processing timeline of the two or more uplink processing timelines identifies a different time duration between each of the plurality of uplink transmissions in a physical uplink shared channel (PUSCH) slot and respective feedback from the base station, wherein the feedback is associated with each of the plurality of uplink transmissions;
  transmit an indication of a first uplink processing timeline, wherein the first uplink processing timeline is selected from the set of uplink processing timelines;
  transmit an uplink transmission of the plurality of uplink transmissions to the base station; and
  monitor for the respective feedback from the base station associated with the uplink transmission based at least in part on the first uplink processing timeline.

* * * * *